United States Patent

Tanaglia et al.

Patent Number: 5,491,208
Date of Patent: Feb. 13, 1996

[54] ETHYLENE-PROPYLENE ELASTOMERIC COPOLYMERS WITH A LOW CONTENT OF RESIDUAL CHLORINE

[75] Inventors: Tiziano Tanaglia, Bologna; Viviano Banzi, Vigarano Mainarda; Elisa Zecchi, Ferrara, all of Italy

[73] Assignee: Enichem Elastomeri S.r.l., Milan, Italy

[21] Appl. No.: 221,256

[22] Filed: Mar. 31, 1994

[30] Foreign Application Priority Data

Apr. 7, 1993 [IT] Italy ................... MI93A0691

[51] Int. Cl.⁶ ............. C08F 4/68; C08F 210/16
[52] U.S. Cl. ............. 526/143; 502/127; 526/153; 526/348
[58] Field of Search ............................ 526/143

[56] References Cited

U.S. PATENT DOCUMENTS

| | | | |
|---|---|---|---|
| 3,520,859 | 7/1970 | Schrage et al. | 526/283 |
| 3,644,311 | 2/1972 | Diliddo et al. | 526/169.2 |
| 3,702,840 | 11/1972 | Diliddo et al. | 526/169.2 |

FOREIGN PATENT DOCUMENTS

| | | |
|---|---|---|
| 0044119 | 1/1982 | European Pat. Off. . |
| 0546629 | 6/1993 | European Pat. Off. . |
| 2729670 | 1/1978 | Germany . |

OTHER PUBLICATIONS

Makromolekulare Chemie, vol. 185, No. 10, Oct. 1984, pp. 2133–2151, E. Giannetti, et al., "Homogeneous Ziegler–Natta Catalysis: Effciency Improvement Of Vanadium Catalyst Systems By Tributyltin Hydride For The Ethylene/Propylene/Diene Terpolymerization".

*Primary Examiner*—Edward J. Smith
*Attorney, Agent, or Firm*—Oblon, Spivak, McClelland, Maier & Neustadt

[57] ABSTRACT

In an improved process for producing elastomeric ethylene-propylene copolymers with a propylene content comprised within the range of from 22 to 38% by weight and a content of residual chlorine, coming from the co-catalyst, lower than 300 parts per million parts, the polymerization is carried out in suspension in the monomers in the liquid state, with vanadium triacetylacetonate and alkyl-Al compounds, and the obtained polymer is recovered without any washing steps.

6 Claims, No Drawings

ETHYLENE-PROPYLENE ELASTOMERIC COPOLYMERS WITH A LOW CONTENT OF RESIDUAL CHLORINE

The present invention relates to a process for producing ethylene-propylene copolymers (EPM) with low level of propylene and containing very reduced amounts of chlorine derived from the catalyst.

The present invention relates as well to the copolymers manufactured by means of said process and to the manufactured articles fabricated from them.

The mechanical properties of ethylene copolymers with alpha-olefins are known to depend on the nature of the olefin and on the used polymerization process (see, e.g., "Encyclopedia of Polymer Science and Technology", Vol. 6, pages 354–357).

From the prior art, also ethylene-propylene elastomers are known as well, which are manufactured on the large industrial scale by means of solution or suspension processes by means of Ziegler-Natta catalysts. Such catalysts are generally constituted by at least two components:

(a) a salt of a transition metal belonging to one of the Periodical System groups from IV to VIII, (b) a metal-organic compound of a metal belonging to a group from groups I and IV of the Periodical System.

In order to obtain copolymers characterized by low crystallinity, narrow distribution of molecular weights and constant composition, as the salt of the transition metal, a vanadium compound is preferred; in this case, the complete catalytic system comprises a third component (c) capable of increasing the polymerization productivity, expressed as kg of polyers produced per g of vanadium per hour (kg pol./gv*h).

Particularly used components of (a) type are vanadium salts with valency of from three to five, such as, e.g., vanadium halides, vanadium oxyhalides, vanadium alkoxides or vanadyl alkoxides and vanadium acetylacetonate.

Preferred components of (b) type are metalorganic compounds of aluminum, such as, e.g., trialkyl-aluminum compounds and alkyl-aluminum halides.

The components of (c) type generally are halogenated organic compounds, such as chloroalkanes or chloroesters, such as, e.g., $CHCl_3$, $CCl_4$, ethyl trichloroacetate or n-butyl perchlorocrotonate.

According to as disclosed in U.S. Pat. No. 4,540,753 at column 14, lines from 50 to 58, in order that the catalytic system may be active in ethylene and propylene copolymerization, it is necessary that at least one of both components (a) or (b) contains halogens.

For the polymerization processes carried out in suspension in liquid hydrocarbons, with operating temperatures not higher than 50° C., a particularly advantageous catalytic system is constituted by vanadium triacetylacetonate ("a" component), diethylaluminum monochloride ("b" component), and n-butyl perchlorocrotonate ("c" component); such a process is economically advantageous as compared to the solution technology, because the polymer can be easily separated from any unreacted monomers by means of stripping operation with steam at 80°–100° C.; by means of this technology, a wide range of copolymers can be obtained which display satisfactory mechanical and elastic properties, to be used for several applications, both as crude polymers, and in their cured state.

The above mentioned vanadium salt-based catalysts generally have a low productivity; furthermore, in the case when the polymer is obtained by stripping without a preliminary washing of the suspension, in said polymer generally remain amounts, which may even be large, of catalytic residues, remain in particular chlorinated residues deriving from the reaction of vanadium salt with the metal-organic co-catalyst.

The problem existed hence of improving the characteristics of the product and reaching the desired purity level, both by increasing the productivity of the catalyst, and reducing in, or eliminating from, the catalytic system, those components which are capable of producing catalytic residues which are difficult to be eliminated, or can be eliminated only by means of a vigorous washing of the polymerization suspensions. In fact, from a large reduction in catalytic residues considerable advantages derive, such as the high stability of the same copolymers to oxidation and chemical agents; thanks to a higher purity of the produced polymers, they can be used in sectors which, otherwise, would be precluded, such as, e.g., the sector of medicine packaging (needle-pierceable rubber vial caps). A decrease in residual chlorine in the produced polymers is desired as well when the polymer is used to coat metal articles subject to undergo corrosion by the chlorinated compounds, such as, e.g., in coating iron tubes with polymeric sheaths.

The present Applicant has surprisingly found now that copolymers of ethylene with propylene, either alone or together with other alpha-olefins, containing very small amounts of residual chlorine, can be produced by using the suspension technique and in the presence of a catalytic system containing a reduced amount of chlorine, and based on a non-chlorinated vanadium salt. Such a copolymer, which has a propylene content comprised within the range of 22 to 38% by weight, can be used in all those applications in which the absence of halogens is an essential requisite.

Therefore, the object of the present invention is a process for preparing ethylene copolymers with alpha-$C_3$–$C_{10}$-olefins, operating with the copolymer in suspension in the mixture of monomers in the liquid state, characterized in that (a) the molar ratio of alpha-$C_3$–$C_{10}$-olefin(s) to ethylene in liquid phase is comprised within the range of from 7 to 15, (b) the polymerization is carried out in the presence of a catalytic system comprising:
  (i) an organic compound of vanadium, which does not contain chlorine,
  (ii) a mixture of at least one alkyl-Al compound with at least one chloro alkyl-Al, such that the atomic ratio of Cl/Al is lower than, or equal to, 0.5,
  (iii) a chlorinated ester, with the molar ratio of (iii)/(i) being comprised within the range of from 1 to 10.

A preferred embodiment of the present invention is a process as defined above, in which (a) the molar ratio of the alpha-$C_3$–$C_{10}$-olefin(s) to ethylene is comprised within the range of from 7 to 13, (b) the polymerization is carried out in the presence of a catalytic system comprising:
  (i) vanadium triacetyl-acetonate,
  (ii) a mixture of diethyl-aluminum monochloride (DEAC) and triethyl-aluminum (TEAL) or triisobutyl-aluminum (TIBAL), such that the atomic ratio of chlorine:aluminum is lower than, or equal to, 0.5,
  (iii) ethyl chloroacetate (ETA) or n-butyl perchlorocrotonate (n-BPcc).

As non-chlorinated vanadium compounds, all those compounds which are known for such a polymerization kind can be used, in particular vanadium triacetylacetonate, vanadylacetylacetonate, vanadium oxobutoxide, trialkylvanadanes, alkoxyoxovanadium-beta-diketonates.

With the basic proviso for the purpose of the present invention, i.e., that a mixture of at least one alkyl-Al compound with at least one chloro alkyl-Al compound is used, and such that the atomic ratio of Cl:Al is ≦0.5, being given for granted, as alkyl-Al compounds, those compounds are useable which are comprised within the scope of the general formula:

$$R_1R_2R_3—Al$$

in which $R_1$, $R_2$ and $R_3$, which are the same or different from one another, are alkyl radicals having from 1 to 8 carbon atoms.

As chloro alkyl-aluminum compounds, those can be used which are comprised within the scope of the general formula:

$$R_1—Al—X_1X_2$$

wherein $R_1$ has the above defined meaning, and $X_1$ and $X_2$, which are the same or can be different from one another, can be a chlorine, bromine atom, or a radical of $R_1$ type, with the proviso that at least one from $X_1$ and $X_2$ is a halogen atom.

As chlorinated esters, particularly suitable are the alkyl or halo alkyl esters of trichloroacetic acid or perchlorocrotonic acid and the alkyl esters of chloroacetic acid; as said above, among them particularly suitable are ethyl chloroacetate and n-butyl perchlorocrotonate.

The process according to the present invention can be applied to the copolymerization of ethylene with propylene or copolymerization of ethylene in mixture with propylene and one or more higher alpha-olefins, such as, e.g., butene-1, pentene-1, decene-1, and so forth.

As said above, the process is carried out in suspension in the monomers in the liquid state, according to the well known technique for such a copolymerization, at temperatures comprised within the range of from 0° to 50° C. (preferably from 30° to 50° C.), and under such pressures as to realize in the liquid phase the desired ratio of propylene (or higher olefin) moles to ethylene moles; such a ratio, as specified hereinabove, is comprised within the range of from 7 to 20 in order to be capable of obtaining, at temperatures comprised within the range of from 30° to 40° C., (co)polymers of EPM type with a propylene content comprised within the range of from 20 to 45% by weight; preferably, such a ratio is comprised within the range of from 7 to 15 which, in the case of ethylene-propylene copolymers produced at temperatures comprised within the range of from 30° to 40° C., corresponds to a propylene level in the copolymer which is comprised within the range of from about 22 to 38% by weight.

Molecular weight regulator agents as hydrogen, diethylzinc and other compounds normally used for such a purpose in this type of polymerizations, can be present in the reaction.

The following examples are supplied in order to illustrate the invention without limiting it.

EXAMPLE 1–13

The polymers were prepared in an autoclave of 3 liters of capacity, by operating according to the following procedure:

After a purge with propylene containing 5% of triisobutylaluminum by weight/volume, then a purge with fresh propylene, 1.8 liters of liquid propylene at room temperature is introduced into the autoclave. The autoclave is heated up to the polymerization temperature and through a dipleg hydrogen and ethylene in gas form are charged in the prefixed ratio [see Table (I)], and in such a way as to reach the desired partial pressures (Table 1).

In order to secure the control of the reaction, the catalytic system is fed during the course of the run as small aliquots; by using two separate metering units, in fact, both following solutions are charged:

(1) toluenic solution of vanadium triacetylacetonate containing the activator,
(2) hexanic solution of cocatalysts (alkyl-Al and chloro alkyl-Al compounds).

The pressure inside the autoclave is kept constant during the test run by feeding ethylene from a controlled-weight cylinder.

At the end of the test run, the residual monomers are vented off and the polymerization products are discharged from the autoclave.

The polymer is finally homogenized with a roller mixer and is characterized.

On it, the following measurements are carried out:

Propylene Content via IR and Product of Monomer Reactivity Ratios ($r_1 \times r_2$)

These analyses were carried out on the polymer as a film of 0.2 mm of thickness, by using an FTIR spectrophotometer Perkin-Elmer model 1760.

The propylene content was determined by measuring the ratio of the absorbances of the bands at 4390 and 4255 cm$^{-1}$, and using a calibration curve obtained with standard copolymers. The product "$r_1 \times r_2$" was determined by means of the spectroscopic method reported in technical literature [European Polymer Journal, 4, Pages 107–114, (1968)].

Inherent Viscosity

The measurements were carried out in orthodichlorobenzene at 135° C.

Molecular Weight Distribution

The analyses were carried out by gel-permeation chromatography in orthodichlorobenzene at 135° C., using a "WATERS" chromatograph model ALC/GPC 150 equipped with a refractive index detector and a bank of PL GEL columns of 10 microns with porosity of $13^3$, $10^4$, $10^5$, $10^6$. The calibration curve used for the calculation was obtained by using monodispersed standard polystyrene samples, by applying the Mark-Houwink equation valid for linear polyethylene and polypropylene; the molecular weight values were corrected as a function of composition by means of Scholte equation (Th. G. Scholte, N. L. J. Meijerink et al.; J. Appl. Polym. Sci., 1984, 29, pages 3763–3782).

The basic parameters of the synthetic routes used in order to produce the polymers of examples from 1 to 13 are reported in Table (I), and the results of the analyses carried out on the resulting polymers are reported in Table (II).

The content of residual chlorine from DEAC, reported in Table (I), was computed by starting from the amount of chlorinated metal-organic compound (DEAC) charged to the autoclave.

The chlorine deriving from the "C" component is regarded as being removable during the operations of aqueous stripping.

Examples 1, 2, 6, 7 and 10 are comparison examples and display that the catalytic system has such a productivity as to leave inside the polymer a chlorine content from metal-organic catalytic residues higher than 300 ppm when the molar ratio of DEAC:TEAL (diethyl-Al monochloride:triethyl-Al) is higher than 0.5, or when the propylene content in the polymer is higher than 38% by weight (molar ratio of propylene to ethylene in liquid phase higher than 15).

On the contrary, examples 3, 4, 5, 8, 9, 11, 12, 13 and 14, show that the combination of:

a molar ratio of DEAC:TEAL or (DEAL:TIBAL) in polymerization such that the atomic ratio of chlorine:aluminum is lower than, or equal to, 0.5; and a lower propylene content in the copolymer than 38% by weight (corresponding to a lower molar ratio of propylene to ethylene in the liquid phase than 15), makes it possible the productivity of the catalyst to be increased to such an extent that a copolymer is obtained with a lower content of chlorine from metalorganic catalytic residues than 300 ppm.

TABLE I

| Examples | Temperature (°C.) | Propylene/ethylene solar ratio in liquid phase | Pressures Ethylene (bar) | Hydrogen (bar) | Total (bar) | Time (min) | "a" Comp. (1) (mmol/l) |
|---|---|---|---|---|---|---|---|
| 1 (Comp. Example) | 40 | 15.7 | 3 | 0.5 | 18.9 | 60 | 0.076 |
| 2 (Comp. Example) | 40 | 7.3 | 6 | 1.8 | 23.3 | 40 | 0.0317 |
| 3 | 25 | 13.3 | 2.9 | 0.5 | 14 | 60 | 0.0417 |
| 4 | 40 | 7 | 6.3 | 1 | 22.6 | 60 | 0.0205 |
| 5 | 40 | 7 | 6.3 | 0.7 | 22.4 | 40 | 0.0473 |
| 6 (Comp. Example) | 40 | 15.7 | 3 | 0.7 | 19.1 | 60 | 0.062 |
| 7 (Comp. Example) | 30 | 19 | 2.2 | 0.2 | 14.4 | 30 | 0.048 |
| 8 | 40 | 15.7 | 3 | 0.4 | 18.8 | 60 | 0.0425 |
| 9 | 40 | 11.5 | 4 | 0.3 | 19.7 | 60 | 0.048 |
| 10 (Comp. Example) | 40 | 7 | 6.3 | 2 | 23.7 | 60 | 0.0285 |
| 11 | 30 | 9 | 4.5 | 2.5 | 19 | 60 | 0.032 |
| 12 | 40 | 7 | 6.3 | 1 | 22.7 | 60 | 0.0478 |
| 13 | 40 | 7 | 6.3 | 0.7 | 22.4 | 60 | 0.029 |
| 14 | 40 | 7.3 | 6 | 0.5 | 22 | 60 | 0.03 |

| Examples | "b" Component Total Al (mmol/l) | Cl/Al (mol/mol) | "c" Component Type (3) | "c"/V (2) (mol/mol) | Polymer weight (g) | Yield (kg/gV) | Residual chlorine from DEAC (4) (ppm) | Total residual chlorine (5) (ppm) |
|---|---|---|---|---|---|---|---|---|
| 1 (Comp. Example) | 3.04 | 1 | ETA | 4 | 110 | 15.7 | 1773 | 2305 |
| 2 (Comp. Example) | 1.27 | 1 | ETA | 4 | 86 | 29.5 | 945 | 1228 |
| 3 | 1.21 | 0.45 | ETA | 6.8 | 184 | 48.5 | 187 | 480 |
| 4 | 0.84 | 0.25 | ETA | 4 | 235 | 123.8 | 58 | 125 |
| 5 | 1.89 | 0 | ETA | 4 | 153 | 52.4 | 0 | 159 |
| 6 (Comp. Example) | 2.48 | 1 | n-BPCC | 4 | 132 | 23.2 | 1200 | 1800 |
| 7 (Comp. Example) | 1.92 | 0.5 | n-BPCC | 4 | 72 | 16.4 | 849 | 1697 |
| 8 | 1.93 | 0.25 | n-BPCC | 4 | 135 | 30.8 | 257 | 708 |
| 9 | 1.91 | 0 | n-BPCC | 6 | 73 | 16.7 | 0 | 1250 |
| 10 (Comp. Example) | 1.14 | 1 | n-BPCC | 4 | 145 | 55.2 | 504 | 756 |
| 11 | 1.28 | 0.5 | n-BPCC | 4 | 173 | 59.2 | 235 | 470 |
| 12 | 1.91 | 0.24 | n-BPCC | 4 | 200 | 45.7 | 146 | 451 |
| 13 | 1.15 | 0 | n-BPCC | 4 | 186 | 70.8 | 0 | 197 |
| 14 | 1.29 | 0.25(*) | n-BPCC | 4 | 245 | 83 | 86 | 252 |

(1) Vanadium triacetylacetonate
(2) Molar ratio of "c" component to "a" component
(3) ETA: ethyl trichloroacetate; n-BPCC: n-butyl perchlorocrotonate
(4) Calculated by starting from the charged DEAC amount
(5) Calculated by starting from the charged DEAC and "c" component amounts
(*) "b" component: DEAC + TIBAl mixture

TABLE II

| Examples | Propylene content (% by weight) | $r_1 \times r_2$ | Inherent viscosity (dl/g) | Molecular weight distribution (Mw/Mn) | Weight average molecular weight |
|---|---|---|---|---|---|
| 1 (Comp. Example) | 39.5 | 1.54 | 2.06 | 5.2 | 262949 |
| 2 (Comp. Example) | 24.9 | 0.84 | 1.65 | 6.6 | 166007 |
| 3 | 31.2 | 0.92 | 2.3 | 3 | 121980 |
| 4 | 26.1 | 0.9 | 1.86 | 2.8 | 121702 |
| 5 | 26.1 | 1.01 | 2.08 | 4 | 191460 |
| 6 (Comp. Example) | 38.3 | 0.97 | 1.77 | 2.7 | 168847 |
| 7 (Comp. Example) | 42.3 | 0.99 | 1.83 | | |
| 8 | 37.2 | 0.92 | 2.06 | 3.8 | 123482 |
| 9 | 34.6 | 0.89 | 1.59 | 4.5 | 174539 |
| 10 (Comp. Example) | 25 | 0.75 | 2.36 | 4.2 | 216648 |
| 11 | 25 | 0.78 | 1.08 | | |
| 12 | 24.4 | 0.67 | 1.78 | 4.9 | 134702 |
| 13 | 22.6 | 0.67 | 3 | 3.82 | 236335 |

TABLE II-continued

| Examples | Propylene content (% by weight) | $r_1 \times r_2$ | Inherent viscosity (dl/g) | Molecular weight distribution (Mw/Mn) | Weight average molecular weight |
|---|---|---|---|---|---|
| 14 | 29.5 | 0.91 | 2.4 | | |

We claim:

1. A process for preparing ethylene copolymers with alpha-$C_3$–$C_{10}$-olefins, operating with the copolymer in suspension in the mixture of monomers in the liquid state, wherein
   (a) the molar ratio of alpha-$C_3$–$C_{10}$-olefin(s) to ethylene in liquid phase is comprised within the range of from 7 to 15,
   (b) the polymerization is carried out in the presence of a catalytic system comprising:
      (i) an organic compound of vanadium, which does not contain chlorine,
      (ii) a mixture of at least one alkyl-Al compound with at least one chloro alkyl-Al, such that the atomic ratio of Cl/Al is lower than, or equal to, 0.5,
      (iii) a chlorinated ester,
      with the molar ratio of (iii)/(i) being comprised within the range of from 1 to 10;
   wherein said polymerization affords a copolymer with a content of chloride from metal-organic catalytic residues lower than 300 ppm.

2. Process according to claim 1, characterized in that it is carried out in suspension in the monomers in the liquid state, at temperatures comprised within the range of from 30° to 50° C. and under such pressures as to realize in the liquid phase the desired ratio of the moles of $C_3$–$C_{10}$-olefin(s) to the moles of ethylene.

3. Process according to claim 1, characterized in that the molar ratio of the alpha-olefin(s) to ethylene in the liquid phase is lower than 13.

4. Process according to claim 1, characterized in that as alkyl-Al compounds, useable are those which are comprised within the scope of the general formula:

$$R_1R_2R_3\text{—Al}$$

in which $R_1$, $R_2$ and $R_3$, which are the same or different from one another, are alkyl radicals having from 1 to 8 carbon atoms, and as chloro alkyl-aluminum compounds, those compounds can be used which are comprised within the scope of the general formula:

$$R_1\text{—Al—}X_1X_2$$

wherein $R_1$ has the above defined meaning, and $X_1$ and $X_2$, which are the same or can be different from one another, can be a chlorine atom, a bromine atom, or a radical of $R_1$ type, with the proviso that at least one from $X_1$ and $X_2$ is a halogen atom.

5. Process according to claim 1, characterized in that the polymerization is carried out in the presence of a catalytic system comprising:
   (i) vanadium triacetyl-acetonate,
   (ii) a mixture of diethyl-aluminum monochloride (DEAC) and triethyl-aluminum (TEAL) or triisobutylaluminum (TIBAL), such that the atomic ratio of chlorine:aluminum is lower than, or equal to, 0.5,
   (iii) ethyl chloroacetate (ETA) or n-butyl perchlorocrotonate (n-BPcc).

6. The process according to claim 1, wherein said organic compound of vanadium, which does not contain chlorine, is selected from the group consisting of vanadium triacetylacetonate, vanadyl acetylacetonate, vanadium oxobutoxide, trialkyl vanadanes, and alkoxy oxo vanadium-beta-diketonates.

* * * * *